US011087376B2

(12) United States Patent
Cuppari et al.

(10) Patent No.: US 11,087,376 B2
(45) Date of Patent: Aug. 10, 2021

(54) SYSTEM AND METHOD FOR INTEGRATING A BEVERAGE DISPENSING APP FOR ORDERING AND DISPENSING A BEVERAGE

(71) Applicant: The Coca-Cola Company, Atlanta, GA (US)

(72) Inventors: Scott Cuppari, Smyrna, GA (US); Steven Hilton, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 107 days.

(21) Appl. No.: 16/341,366

(22) PCT Filed: Oct. 12, 2017

(86) PCT No.: PCT/US2017/056361
§ 371 (c)(1),
(2) Date: Apr. 11, 2019

(87) PCT Pub. No.: WO2018/071685
PCT Pub. Date: Apr. 19, 2018

(65) Prior Publication Data
US 2019/0259077 A1 Aug. 22, 2019

Related U.S. Application Data

(60) Provisional application No. 62/407,380, filed on Oct. 12, 2016.

(51) Int. Cl.
G06Q 30/06 (2012.01)
G06Q 20/20 (2012.01)
(Continued)

(52) U.S. Cl.
CPC ....... G06Q 30/0621 (2013.01); B67D 1/0878 (2013.01); G05B 15/02 (2013.01);
(Continued)

(58) Field of Classification Search
CPC .. G06Q 30/0621; G06Q 30/06; G06Q 20/202; G06Q 20/20
(Continued)

(56) References Cited

U.S. PATENT DOCUMENTS 8,996,178 B2    3/2015  Studor et al.
9,701,530 B2 *  7/2017  Kline ..................... G07F 13/00
(Continued)

FOREIGN PATENT DOCUMENTS

WO    2015168251 A1    11/2015
WO    2016014693 A1    1/2016

OTHER PUBLICATIONS

International Search Report and Written Opinion corresponding to PCT Patent Application No. PCT/US2017/056361, dated Jan. 12, 2018, 8 pages.
Extended European Search Report corresponding to Europe Patent Application No. 17860904.6, dated May 7, 2020.

Primary Examiner — Florian M Zeender
Assistant Examiner — Christopher R Buchanan
(74) Attorney, Agent, or Firm — Foley & Lardner LLP

(57) ABSTRACT

A system and method may present, by a first application being executed by an electronic device, a first user interface that enables a user to select a food item and/or non-food item for purchase at a retail establishment. In response to receiving, by the first application, a request from the user using the first user interface to purchase a beverage at the retail establishment, a second application may be linked with the first application. A data repository inclusive of selectable beverage options available for dispensing by a beverage dispenser at the retail establishment may be accessed. The second application may present a second user interface for selection of a selectable beverage option. A selected beverage instruction code representative of a selected beverage may be generated and communicated to the beverage dis-
(Continued)

penser at the retail establishment to cause the beverage dispenser to be configured for dispensing the selected beverage.

28 Claims, 12 Drawing Sheets

(51) Int. Cl.
*G06Q 50/12* (2012.01)
*B67D 1/08* (2006.01)
*G05B 15/02* (2006.01)
*G06Q 30/00* (2012.01)
*B67D 1/00* (2006.01)
*G06Q 30/02* (2012.01)

(52) U.S. Cl.
CPC ........... *G06Q 20/20* (2013.01); *G06Q 20/202* (2013.01); *G06Q 30/00* (2013.01); *G06Q 30/06* (2013.01); *G06Q 30/0641* (2013.01); *G06Q 50/12* (2013.01); *B67D 1/0015* (2013.01); *G06Q 30/0238* (2013.01)

(58) Field of Classification Search
USPC ...................................................... 705/16, 21
See application file for complete search history.

(56) References Cited

U.S. PATENT DOCUMENTS

| | | | |
|---|---|---|---|
| 2011/0049180 A1* | 3/2011 | Carpenter | B67D 1/0051 222/1 |
| 2013/0087050 A1 | 4/2013 | Studor et al. | |
| 2013/0096715 A1* | 4/2013 | Chung | G06Q 20/387 700/233 |
| 2013/0106690 A1* | 5/2013 | Lim | G06F 3/0482 345/156 |
| 2013/0111328 A1 | 5/2013 | Khanna et al. | |
| 2014/0114469 A1 | 4/2014 | Givens et al. | |
| 2014/0122301 A1* | 5/2014 | Tamassia | G06Q 30/02 705/26.82 |
| 2014/0263418 A1 | 9/2014 | Keating et al. | |
| 2014/0372233 A1* | 12/2014 | Knecht | G06Q 30/0635 705/15 |
| 2015/0046877 A1 | 2/2015 | Cuppari et al. | |
| 2015/0082243 A1* | 3/2015 | Taylor | G07F 9/002 715/814 |
| 2015/0154644 A1 | 6/2015 | Saxena et al. | |
| 2015/0363774 A1 | 12/2015 | Priebatsch et al. | |
| 2016/0027132 A1 | 1/2016 | Craparo et al. | |
| 2016/0363921 A1* | 12/2016 | Martindale | G05B 19/042 |
| 2017/0186110 A1* | 6/2017 | Carpenter | G06K 7/1413 |

* cited by examiner

SYSTEM AND METHOD FOR INTEGRATING A BEVERAGE DISPENSING APP FOR ORDERING AND DISPENSING A BEVERAGE

REFERENCE TO RELATED APPLICATION

This application is a 371 National Phase Application that claims the benefit of International Patent Application No. PCT/US2017/056361, filed Oct. 12, 2017, which claims the benefit of U.S. provisional application No. 62/407,380, Oct. 12, 2016, which is herein incorporated by reference in its entirety.

BACKGROUND

Food services outlets, such as restaurants (e.g., fast food restaurants), are becoming more tech savvy every day. Many restaurants have developed websites that allow for remote food ordering via the Internet. More recently, restaurants have developed mobile apps that allow for customers to preorder or even order their meals on a real-time basis. However, despite the restaurants becoming more tech savvy, various aspects of the food preparation and fulfillment process are inefficient, and in some cases, do not satisfy customer expectation given the level of sophistication that customers have with other mobile apps.

SUMMARY

To create a technically savvy restaurant using a mobile platform, integration of a restaurant mobile app (first app) that integrates with a restaurant's point-of-sale or other payment system may be integrated with a beverage dispenser mobile app (second app) to be integrated with a beverage dispenser or other dispenser machine at the restaurant. In integrating the first and second apps, deep linking or other integration construct from the first app to the second app may be utilized such that the first app may call one or more functions within the second app without having to execute the entire second app. In an embodiment, the second app may operate to enable the user to order a beverage, either with a single ingredient or combination of multiple ingredients.

Depending on the configuration of the restaurant, the mobile device operating on a mobile electronic device may communicate directly or indirectly (e.g., via a server on a communications network) with a beverage dispenser to communicate the beverage order for dispensing thereat. Such ordering may enable a user at a restaurant drive thru to be able to generate and transmit a custom beverage for dispensing by an operator within the restaurant for serving to the user at a drive thru window. Because the user may create and store mixed or customize beverages formed of two or more ingredients, the second app may support the ability of ordering a beverage, single ingredient or mixed ingredient, while purchasing consumable and/or non-consumable items at the retail establishment or food services outlet. The beverage may be selectably dispensed by an operator who works at the retail establishment or user of a customer operated dispenser. In an embodiment, an order identifier may be passed between the first and second apps, and be associated with the beverage order. As an example, the order identifier may be displayed on an electronic display, such as an electronic display on the dispenser, to more easily associated the dispensed beverage with the order.

In another embodiment, rather than using deep linking to integrate the first and second apps, a software developer kit (SDK) may be utilized to integrate functionality of the second app into the first app using an application program interface (API) that enables the first app to be integrated with the second app using subroutine definitions, protocols, or otherwise, as understood in the art, when the first app is compiled. As an example, one function may include a user interface that provides for beverage selections, where the elections may include the ability to create blends of ingredients that may form a beverage (or other foods depending on the type of dispenser). Other embodiments for allowing a restaurant mobile app to access a beverage dispenser app or other app that may additionally be a standalone app for use with restaurant equipment that may be operated by a customer may be utilized.

In yet another embodiment, an API connection from a food outlet app to a cloud-based beverage dispenser interface system may be utilized. This embodiment allows for a user to use the food outlet app without having to download beverage dispenser app, although the user may download the beverage dispenser app for independent usage. The cloud-based beverage dispenser interface system may include functionality that enables a user to view available beverage ingredients to be displayed and/or blended by a user via a mobile device and dispensed at a dispenser at a food outlet at which the user is located. In an embodiment, the cloud-based beverage dispenser interface system may include a data repository that includes one or more lists of dispensers, ingredients of beverages at each dispenser, locations of each dispenser, identifier of each dispenser, food outlet at which each dispenser is located, and other information associated with each dispenser and food outlet. The use of the cloud-based beverage dispenser interface system enables the developer of the cloud-based beverage dispenser interface system to support multiple, disparage food outlet apps from a single platform, maintain a common platform for each, and be agnostic to specific mobile device technology. The cloud-based beverage dispenser interface system may be used to generate a webpage using any webpage generating scripting or programming language, as understood in the art. Such languages, such as Java or HTML5, may be utilized, for example. The user interface may operate to enable the user to view available beverage ingredients, select specific beverages, store and select favorite beverages or blended beverages, and so forth. In response, the cloud-based beverage dispenser interface system may communicate information to the food outlet app, beverage dispenser at the food outlet, and/or POS for dispensing and payment thereat. The information about the dispensing, usage, selected beverage, user information, time stamp, and so on may be stored in a data repository for the user, for inclusion in an aggregated manner, for rewards, and so on.

In still another embodiment, one or more electronic devices configured to present user interfaces may be positioned at or near a dispenser. For example the electronic devices may include kiosks standing on a floor, tablets mounted to a wall, or other electronic devices. In an embodiment, an electronic device may be configured to execute a user interface locally, and be in communication with (i) one or more dispensers in proximate location to the electronic device, (ii) a remote dispenser server that may be configured to support accounts or records for users who may wish to create and save beverage blends, maintain historical records, and so on, (iii) a POS at a food outlet at which the electronic device is located, (iv) mobile devices of users who may have downloaded beverage dispense apps and have beverage favorites stored thereon, (v) third-party server that may participate in supporting the dispenser app usage through promotions, advertisements, or otherwise, or other system. By providing for one or more beverage dispenser user interfaces proximate to the dispenser, a single dispenser may be capable of supporting many users with a much smaller delay than if a line were to form at the dispenser itself, as further described herein.

In one embodiment, a system and method may present, by a first application being executed by an electronic device, a first user interface that enables a user to select a food item and/or non-food item for purchase at a retail establishment. In response to receiving, by the first application, a request from the user using the first user interface to purchase a beverage at the retail establishment, a second application may be linked with the first application for execution by the electronic device. A data repository inclusive of selectable beverage options available for dispensing by a beverage dispenser at the retail establishment may be accessed by the second application. The second application may present a second user interface to enable the user to select one of the selectable beverage options. A selected beverage instruction code representative of a selected beverage may be generated and communicated to the beverage dispenser at the retail establishment to cause the beverage dispenser to be configured for dispensing the selected beverage.

BRIEF DESCRIPTION

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
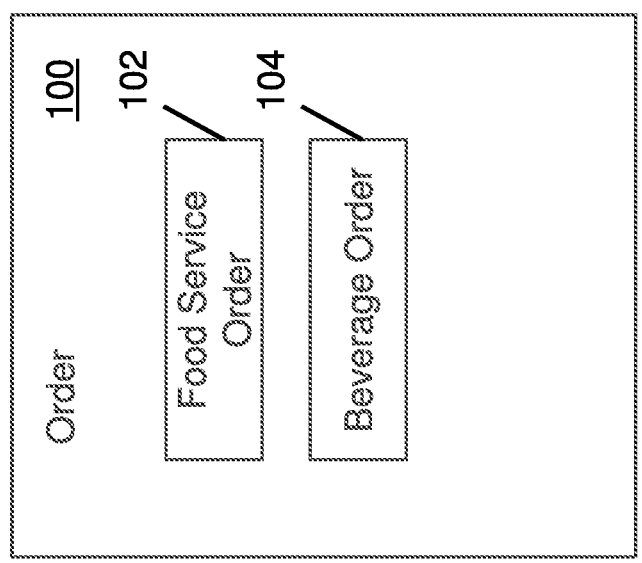
FIG. 1 is an illustration of an illustrative order at a food service outlet at which a beverage dispenser may be configured to be instructed to prepare and dispense beverages.

With regard to FIG. 1, an illustration of an illustrative order 100 at a food service outlet at which a beverage dispenser may be configured to be remotely instructed to prepare and dispense beverage items is shown. The order 100 may be include data to be electronically communicated, and include (i) a food service order 102 in the form of digital data, and (ii) beverage order 104 in the form of digital data. The food service order 102 may include data representative of food products (e.g., hamburgers, hot dogs, or any other non-beverage food products) selected to be ordered by a user. The beverage order 104 may include information about a beverage being ordered with the food service order 102. The beverage may include a single ingredient or a blend of beverage ingredients. The beverage ingredients may include ingredients for producing branded beverages and flavor additives that can be added to branded beverages that may be dispensed by a beverage dispenser at the food service location.

The ingredients for producing branded beverages, such as a cola soft drink, lemon-lime soft drink, orange soft drink, etc., may include traditional beverage concentrates, base beverage concentrates, or syrups. The traditional beverage concentrates, base beverage concentrates, or syrups may be mixed with water, carbonated water, or other diluent by a post-mix dispenser to produce a finished beverage. The traditional beverage concentrates, base beverage concentrates, or syrups typically have reconstitution ratios in the range of 3:1 to 5:1 or upwards of 8:1.

The ingredients for producing branded beverages may also include beverage base components such as a separately stored and dispensed sweetener and un-sweetened flavor component(s) or micro-ingredients. In some instances, the un-sweetened flavor component may include elements that provide some level of sweetness, but no added sweetener is provided in the un-sweetened flavor component. The sweetener and un-sweetened flavor component(s) can be mixed with water, carbonated water, or other diluent by a post-mix dispenser to produce a finished beverage. In some embodiments, the un-sweetened flavor component(s) may include separately stored and dispensed acid and acid-degradable flavor components of the branded beverage. As such, the acid un-sweetened flavor component, the acid-degradable un-sweetened flavor component, the sweetener, and the diluent (water, carbonated water or other) may all be mixed together by a post-mix dispenser to produce a finished beverage. The sweetener typically has a reconstitution ratio in the range of 3:1 to 5:1 or upwards of 8:1 for nutritive sweeteners or in the range of 10:1 or greater, 25:1 or greater, 50:1 or greater, 150:1 or greater, or 300:1 or greater for high-intensity sweeteners. The un-sweetened flavor components typically have reconstitution ratios of 10:1 or greater, 25:1 or greater, 50:1 or greater, 150:1 or greater, or 300:1 or greater.

The flavor additives may include flavors such as cherry, raspberry, vanilla, etc. that are not intended to form a finished beverage by themselves or when only mixed with a diluent. In some instances, flavor additives may be dispensed as flavor shots in which only the flavor additive is dispensed. Such flavor shots may be added to a finished beverage that has already been dispensed into a cup or other vessel. In some instances, flavor additives may be dispensed at the same time as the beverage ingredients for producing branded beverages. As such, flavored versions of a branded beverage may be produced, such as a cherry flavored cola soft drink, a raspberry flavored lemon-lime soft drink, a vanilla flavored orange soft drink, etc. As such, the flavor additives may be mixed with any of the above described ingredients for producing a branded beverage.

In some instances, the flavor additives may be added as a flavor shot at some point during the dispense of the branded beverage, such as at the beginning or the end of a dispensing operation for dispensing a branded beverage. In some instances, the flavor additives may be added continuously at a predetermined ratio along with the beverage ingredients for producing a branded beverage. The ratio may be based on a recipe associated with the branded beverage so as to produce a branded flavored beverage (e.g., cherry-cola soft drink) as opposed to a flavored branded beverage (e.g., cola soft drink with cherry). In the former case, the amount of cherry or other flavor additive may be tailored to the specific branded beverage being dispensed. For example, more cherry may be added when dispensing a cherry-cola branded soft drink and less cherry may be added when dispensing a cherry-lemon-lime branded soft drink. In the latter case, the amount of cherry or other flavor additive may be substantially the same for all branded beverages (e.g., 1 oz. of flavor additive whenever a branded beverage is dispensed with a flavor additive).

When dispensing a blend of beverage ingredients, a blended beverage may be dispensed. A blended beverage includes beverage ingredients for two or more branded beverages (e.g., ingredients for a lemon-lime branded and an orange branded beverage) to be dispensed together to form a finished beverage. Such blended beverages may be dispensed with any combination of the above described branded beverage ingredients and/or flavor additives.

Figure 2:
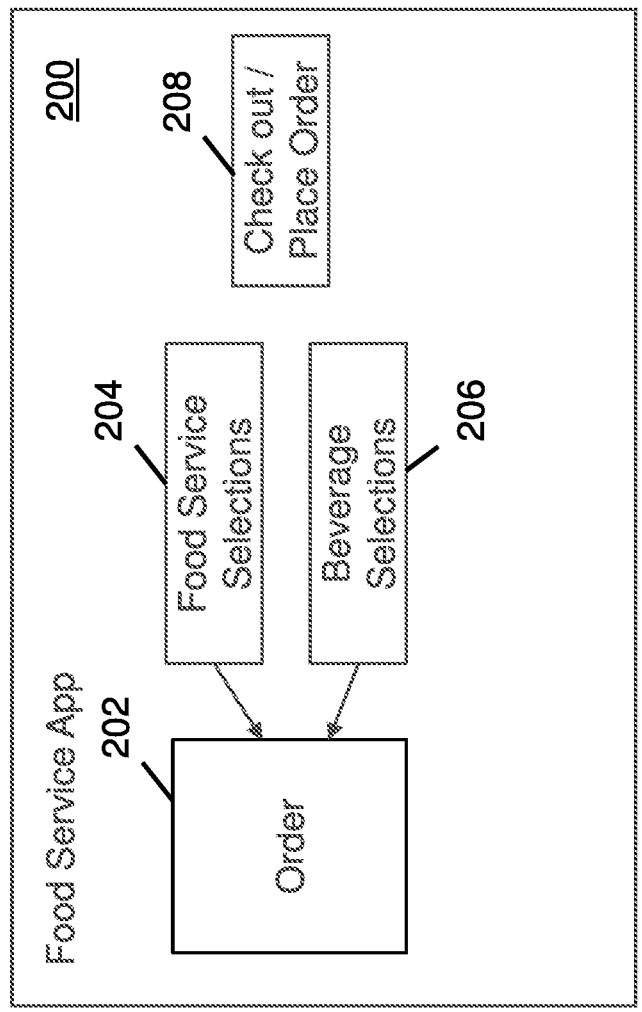
FIG. 2 is an illustration of illustrative functions performed by a food services software application.

With regard to FIG. 2, an illustration of illustrative functions performed by a food services software application 200 is shown. The food services application 200 may be configured to create an order 202 by providing the user with food service selections 204 and beverage selections 206. Because a dispenser may be operated within a food services outlet, such as a restaurant or store, the retail environment may desire to provide customers with their own application that may be accessed via a desktop or mobile device. As understood in the art, providing customers with a branded application may provide customer loyalty, branding, and higher revenue. However, because customers may be familiar with or already established a certain amount of loyalty for a beverage app that enables the customers to create and store their own blended beverages, the customers may desire to be able to select and dispense those blended beverages when at the retail establishment. Moreover, the food services outlet may desire to support those apps at their food services outlet so as to support functionality with which customers are already familiar and desire. The food services outlets, however, do not desire to create applications to support those functions or to recreate an already well-working app and integrated functionality. As such, an embodiment that supports the food services outlet and beverage dispenser owner may include a food services application that is able to interface with the beverage dispenser application in a manner that allows for the beverage dispenser application to be operated independently or in conjunction with the food services application, as further described herein.

The food service selections 204 may include a menu listing of foods available at the food services outlet. The food service selections 204 may provide for combination meals, snacks, deserts, and so forth, and may also include a beverage and/or beverage size selection. In an embodiment, the beverages may be prepackaged beverages (e.g., individual containers of milk, cans of beverages, bottles of beverages). However, for dispensed beverages, such as soft-drinks, the food services application 200 may use the beverages selections 206 function by performing a call (e.g., deep linking call, API call, etc.) to a second mobile app from the food services application 200. In an embodiment, the second mobile app may be downloaded and executed on the mobile device, and be capable of communicating directly or indirectly with a beverage dispenser at the food services outlet. In an alternative embodiment, the second mobile app may be cloud-based and be accessed via an API call over a communications network, such as the Internet via a mobile network or Wi-Fi network, for example. A check out/place order 208 function may be provided to enable the user to indicate that his or her order is complete, and that the user is ready to place his or her order. In placing his or her order, the user may make a payment via the food services application 200 with a point-of-sale (POS) local to the food services outlet or retail environment. In an alternative embodiment, the user may pay at the POS, and the POS may communicate a selected beverage to the dispenser. By integrating the food services application 200 with a beverage dispenser application, customers who are already familiar with and have beverage data stored with the beverage dispenser application may be able to readily use the application, and the food services outlet may be able to produce the food services app faster.

Figure 3:
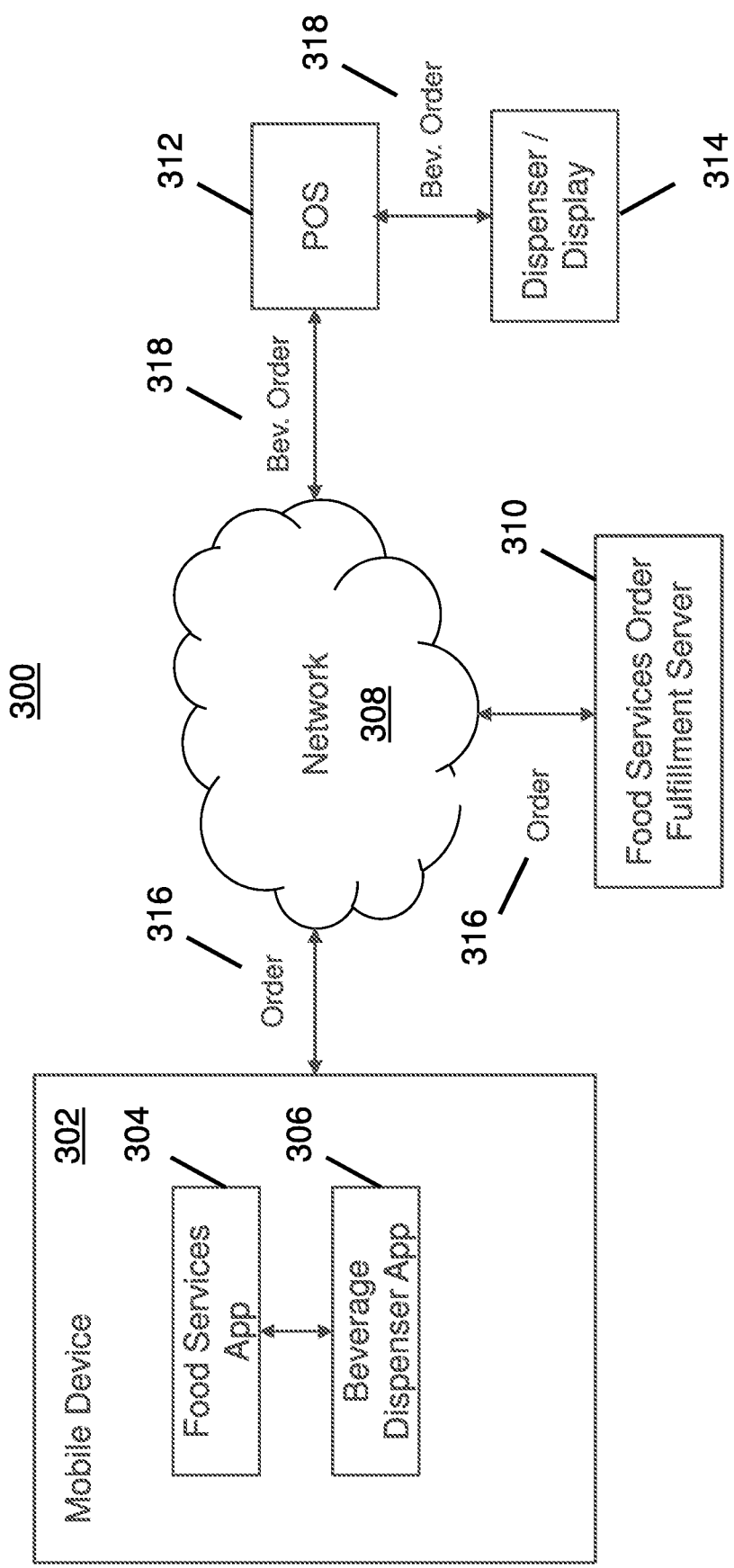
FIG. 3 is an illustration of an illustrative food services outlet environment in which users may use mobile devices to place food and/or beverage orders within the food services outlet environment.

With regard to FIG. 3, an illustration of an illustrative food services outlet environment 300 in which users may use mobile devices to place food and/or beverage orders within the food services outlet environment 300 is shown. A mobile device 302 may include a food services app 304 and beverage dispenser app 306 may be integrated to provide for enhanced food services ordering functionality within a food services outlet is shown. The food services app 304 may be a mobile application available to be used to place an order at or within a retail environment, such as a food services outlet. As shown, the food services app 304 may interact with the beverage dispenser app 306 in the event that a user desires to purchase a beverage that is dispensed by a beverage dispenser, such as a soft-drink dispenser, at the food services outlet.

In operation, the food services app 304 may perform a deep linking call to or otherwise be integrated with the beverage dispenser app 306 to utilize one a more functions of the beverage dispenser app 306 that enables the user to select a beverage and/or create a beverage or blended beverage from multiple ingredients to be dispensed by a beverage dispenser. The beverage dispenser app 306 may be utilized as a standalone app by a user at any retail environment in which a beverage dispenser is configured to communicate with a mobile device with the beverage dispenser app 306. For example, the user may generate a blended beverage including two or more ingredients available to be dispensed by the dispenser. The user may also designate favorite beverages or browse beverage selection options, and select any designated beverage for dispensing thereat.

The mobile device 302 may communicate via network 308 with a food services order fulfillment server 310. The mobile device 302 may receive a beacon communication, geo-fence notification, or other event, such as a user actively engaging the food services app 304, to initiate a communicating with a point-of-sale system 312 at the food services outlet. The point-of-sale system 312 may be in communication with a beverage dispenser 314 to communicate beverage orders to be dispensed thereby.

In operation, in response to the user using the mobile device selecting a food and beverage order, order data 316 may be communicated via the network 308 to the food services order fulfillment server 310. The server 310 may be located within the food services outlet or on a communications network, such as the Internet. The user's order may be paid for by the user entering his or her payment information into the food services app 304, and may be included with the order data 316. Alternatively, the user may make payment at the point-of-sale system 312 upon picking up his or her order.

A beverage order of the user may be communicated to the point-of-sale 312 with beverage order data 318 that may, in turn, communicate the beverage order data 318 to the beverage dispenser 314. The beverage dispenser 314 may be automatically configured in response to receiving the beverage order data 318 to dispense a beverage represented by data (e.g., beverage instruction code) in the beverage order data 318. In an embodiment, the dispenser 314 may automatically dispense the beverage. In another embodiment, personnel at the food services outlet may operate the beverage dispenser 314 to dispense the beverage by selecting an identifier associated with the beverage order data 318 on a display at the dispenser. Still yet, if the dispenser 314 is available for the user to dispense his or her own beverage, then the user may select his or her beverage associated with the beverage order data 318 via a user interface to cause the dispenser to create and dispense the beverage from the dispenser. As an example, a user interface on a display at the dispenser 314 may list orders sent to the display by users, and the user may select his or her order from the list of orders. The list may include an order number (not shown) created by the food services order fulfillment server 310 or POS 312. Rather than using an order number, another indicator, such as beverage size and ingredient(s), user identifier, portion of telephone number (e.g., last 4 digits of phone number), email address, or other indicator associated with the beverage order data 318 may be listed at the dispenser for selection by an operator to dispense the beverage order.

Figure 4:
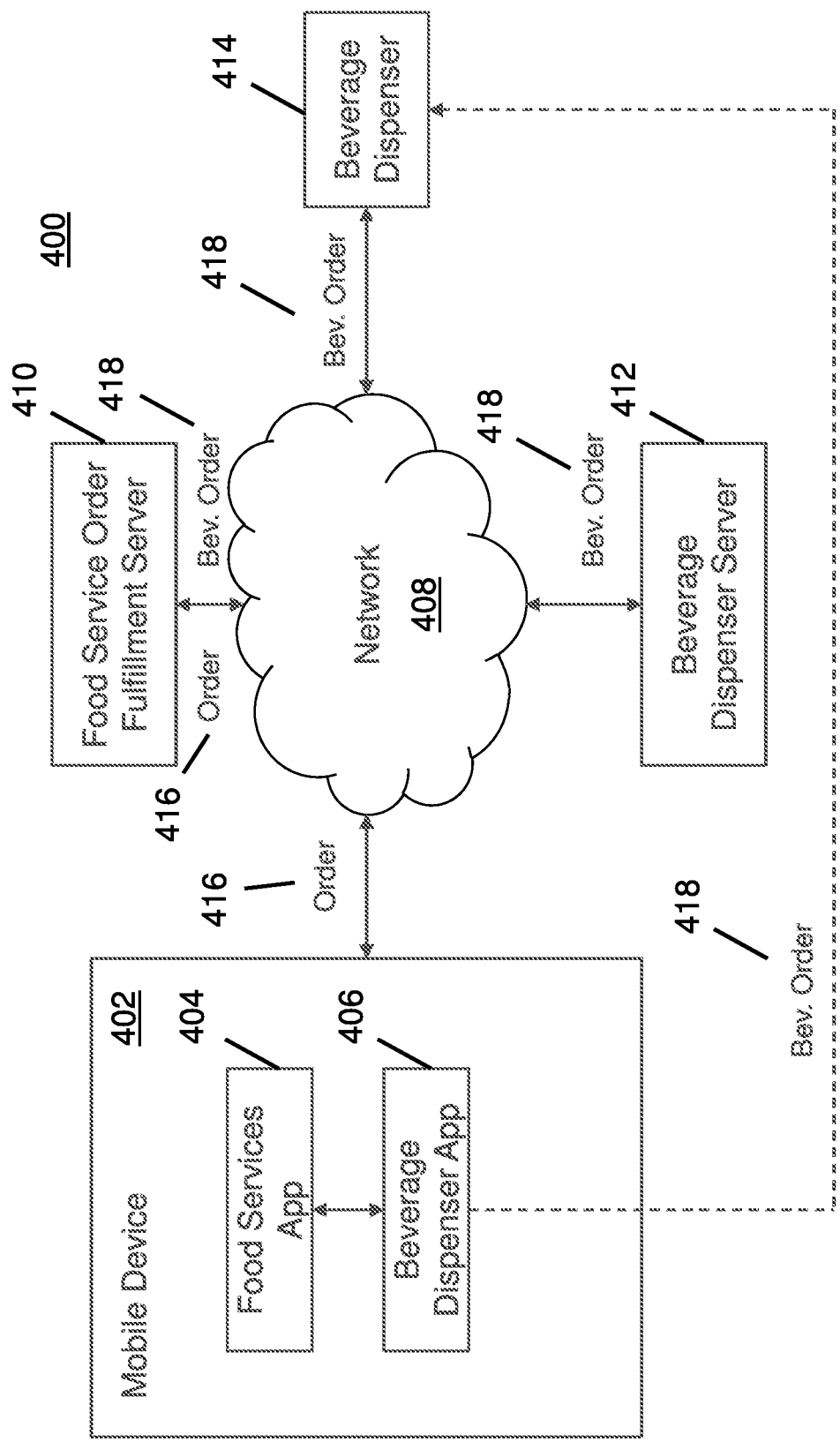
FIG. 4 is an illustration of an alternative illustrative food services outlet environment in which users may use mobile devices to place food and/or beverage orders within the food services outlet environment.

With regard to FIG. 4, an illustration of an alternative illustrative food services outlet environment 400 in which users may use mobile devices to place food and/or beverage orders within the food services outlet environment is shown. In an embodiment, a mobile device 402 may be configured with a food services app 404 and beverage dispenser app 406. The food services app 404 may be a mobile application available to be used to place an order at or within a retail environment, such as a food services outlet. As shown, the food services app 404 may interact with the beverage dispenser app 406 in the event that a user desires to purchase a beverage that is dispensed by a beverage dispenser, such as a soft-drink dispenser, at the food services outlet.

In operation, the food services app 404 may perform a deep linking call to or otherwise integrated with the beverage dispenser app 406 to utilize one a more functions of the beverage dispenser app 406 that enables the user to select and/or create a beverage or blended beverage from multiple ingredients to be dispensed by a beverage dispenser. The beverage dispenser app 406 may be utilized as a standalone app by a user at any retail environment in which a beverage dispenser is configured to communicate with a mobile device with the beverage dispenser app 406. For example, the user may generate a blended beverage including two or more ingredients available to be dispensed by the dispenser. The user may also designate favorite beverages or browse beverage selection options.

The mobile device 402 may communicate via network 408 with a food services order fulfillment server 410. The mobile device 402 may receive a beacon communication, geo-fence notification, or other event, such as a user actively engaging the food services app 404, to initiate a communicating with the food service order fulfillment server 410 to initiate an order at the food services outlet. The service order fulfillment server 410 may parse the order data 416 to identify beverage order data 418 embedded or associated therewith. The food service order fulfillment server 410 may be in communication with a beverage dispenser server 412 or beverage dispenser 414, and communicate the beverage order data 418 to the server 412 or beverage dispenser 414. The beverage dispenser server 412 may communicate the beverage order data 418 to the dispenser 414 to enable dispensing the selected beverage.

In an embodiment, the mobile device 402, executing the beverage dispenser app 406, may be configured to communicate the beverage order data 418 directly to the beverage dispenser when in communication with the beverage dispenser 414. The mobile device 402 may communicate directly with the dispenser using a local communications protocol, such a Wi-Fi®, Bluetooth®, or other local communications channel, or via a mobile wireless communications channel or otherwise. In an embodiment, a registration or other process may be performed by the beverage dispenser 414 to verify that the user of the mobile device 402 has an account with the beverage dispenser server 412. Other embodiments may allow for the beverage dispenser app 406 to engage with the beverage dispenser 414 to cause the beverage dispenser 414 to dispense a beverage selected and/or created by the user of the mobile device 402.

In operation, in response to the user using the mobile device selecting a food and beverage order, order data 416 may be communicated via the network 408 to the food services order fulfillment server 410. The server 410 may be located within the food services outlet or on a communications network, such as the Internet. The user's order may be paid for by the user entering his or her payment information into the food services app 404, and may be included with the order data 416.

The beverage dispenser 414 may be automatically configured in response to receiving the beverage order data 418 to dispense a beverage represented by data (e.g., beverage instruction code) in the beverage order data 418. In an embodiment, the dispenser 414 may automatically dispense the beverage. In another embodiment, personnel at the food services outlet may operate the beverage dispenser 414 to dispense the beverage by selecting an identifier on a display at the dispenser associated with the beverage order data 418. Still yet, if the dispenser 414 is available for the user to dispense his or her own beverage, then the user may select his or her beverage associated with the beverage order data 418 via a user interface to cause the dispenser to be configured and dispense the beverage from the dispenser. As an example, a user interface on a display at the dispenser 414 may list all orders sent to the display by users, and the user may select his or her order from the list. The list may include an order number (not shown) created by the food services order fulfillment server 410. Rather than using an order number, another indicator, such as beverage size and ingredient(s), user identifier, portion of telephone number (e.g., last 4 digits of phone number), email address, or other indicator associated with the beverage order data 418 may be listed at the dispenser for selection by an operator to dispense the beverage order. A point-of-sale may also be located at the food services environment that enables the user to perform conventional purchasing of food and/or beverages.

Figure 5:
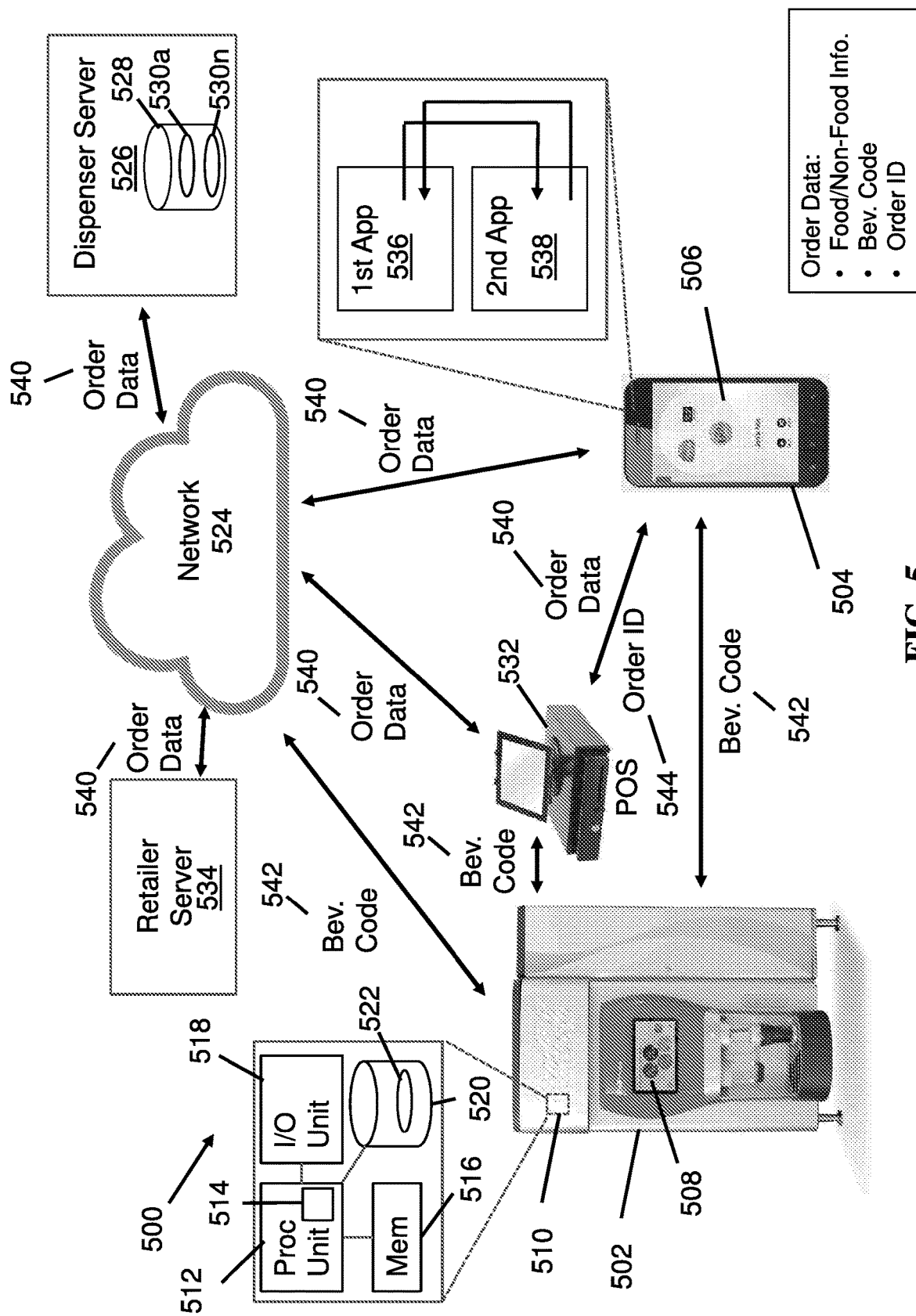
FIG. 5 is an illustration of an illustrative dispenser environment inclusive of a dispenser configured to dispense beverages selected by a user via an application executed on an electronic device, such as a mobile app executed on a mobile electronic device.

With regard to FIG. 5, an illustration of an illustrative dispenser environment 500 inclusive of a dispenser 502 configured to dispense beverages selected by a user via an electronic device 504 with a user interface 506 thereon, such as a mobile app being executed on a mobile electronic device, is shown. The dispenser 502 may include an electronic user interface ("UI") 508, such as a touchscreen, that enables selectable indicia to be displayed. To control the dispenser 502 and UI 508, a circuit 510 inclusive of a processing unit 512 may be utilized to execute machine readable instructions 514 to perform a variety of functions, as further described herein. The processing unit 512 may include one or more computer processors and/or discrete electronic devices. In an embodiment, the processing unit 512 may include an EEPROM, FPGA, ASIC, discrete logic, or any combination thereof for performing one or more functions, including monitoring ingredient levels in cartridges or other containers, establishing communications with operators, monitoring operations of the dispenser, and so forth.

The dispenser 502 may be configured to dispense drinks, such as soft-drinks, coffees, teas, sports drinks, alcoholic beverages, and so forth. Alternatively, the dispenser 502 may be configured to dispense foods, such as ice creams, optionally with toppings or mix-ins, snack mixes, hot foods, and so forth. Still yet, the dispenser 502 may be configured to dispense a combination of foods and beverages, such as (i) soups with noodles, rice, and/or protein (chicken, beef, shrimp), (ii) hot chocolate with marshmallows, (iii) soup and salad, (iv) milkshakes, and so on. The consumable ingredients may be stored in containers, such as cartridges, bins, jugs, bags-in-boxes, or any other container, as understood in the art.

The processing unit 512 may be in communication with a memory 516 that may be configured to store data, such as available ingredients, registered users, local registered users, dispenser information (e.g., name, ID, store number, geophysical coordinates, etc.), and so on. An input/output (I/O) unit 518 may enable the dispenser 502 to communicate information externally from the dispenser 502 utilizing any wired and/or wireless communications protocol, as understood in the art. A storage unit 520 may be configured to store a data repository or database 522 that stores information of consumable ingredients (not shown) available to be dispensed by the dispenser 502.

As further shown, the dispenser 502 may be configured to communicate data over a communications network 524 with a server 526 operating a storage unit 528 for storing information associated with the dispenser 502 in data repositories 530a-530n (collectively 530). It should be understood that the data repositories 530 may be used to store data from multiple dispensers, such as from multiple restaurants or stores of respective chains.

The retail environment may include a point-of-sale 532 that enables the retailer to collect payment from customers. In an embodiment, the POS 532 may be manually operated. In another embodiment, the POS 532 may be configured to interact directly or indirectly with the electronic device 504 to enable the user to purchase goods or services via the electronic device 504 with the POS 532, as further described herein. A server 534 may be configured to processes orders by or for the retailer, and may be in communication with the POS 532 to support the purchases being made at the retailer by customers. The server 534 may be owned by the retailer or card processor so that cash, credit, debit, or other form of payment may be transacted.

The electronic device 504 may include a processing unit, memory, and I/O unit, as understood in the art, and may be configured to execute multiple apps simultaneously. As shown, the electronic device 504 may execute a first app 536 and a second app or portion thereof 538. The first app 536 may be a retailer app that allows for a retailer to promote goods and/or services at the retail environment, enable purchasing by the user of the electronic device 504, and performing other actions. As previously described, the user may wish to purchase a beverage or other dispensed item from the dispenser 502. To provide an integrated app environment, the first app 536 and the second app 538 may be in communication with one another using deep linking or integration during development via an API as supported through use of a software development kit, thereby allowing the user to have functions of two apps without having to download both. In another embodiment, beverage dispensing services may be supported by the first app 536.

In operation, the user may use the first app 536 to engage view and select goods (e.g., hamburger, fries, and beverage size), and, responsive to the user selecting to purchase a dispensed item (e.g., beverage), the first app 536 may call or otherwise interact with the second app 538 or portion (e.g., function) thereof to select a beverage ingredient or multiple beverage ingredients to be blended. By enabling the first app 536 to be able to call using deep linking to call a function within the second app 538 or by a compiled integration of one or more functions of the second app 538, the user may utilize the first app 536 (e.g., restaurant app) and the second app 538 (i.e., dispenser app) without having to learn a new user interface for the dispenser. Moreover, because the dispenser app is one that may be operated independently and in any retail environment at which a dispenser may be available, the user may access his or her previously stored favorite beverages or beverage blends, as previously created and stored by the user. The second app 538 may access the previously stored favorite beverages or beverage blends (or other food blends) as stored on the electronic device 504 or dispenser server 526. The beverage blends may be stored as beverage instruction codes that represent ingredients and percentages of ingredients that are to be blended by the dispenser 502.

As the user uses his or her electronic device 504 to order goods and/or services to purchase at the retail environment, order data 540 may be created by the first app 536 and second app 538. The first app 536 may create order data, optionally including a beverage size selection. Responsive to the user selecting to purchase a beverage via the first app 536, the first app 536 may communicate with the second app 538 to enable the user to select one or more ingredients (e.g., beverage brands and/or flavors of the beverage brands) to dispense. Rather than selecting beverage brands and/or flavors of the beverage brands, the user may select from a list of blends that he or she had previously created or available for the user to select (e.g., friend's blend that the user received from his or her friend). It should be understood that the dispenser may include any other type of dispenser, including food, food and beverage, and so on. The second app 538 may generate and/or access via the electronic device or dispenser server 526 a beverage instruction code or beverage code 542, where the beverage code 542 may include identifiers indicative of ingredients and percentages of ingredients to include in a beverage (e.g., "CC0-50; CCR-50" for Coca-Cola Zero® 50% and Coca-Cola Raspberry® 50%).

In an embodiment, the beverage code 542 may be communicated from the second app 538 to the first app 536 for communication to either of the servers 526 or 534, POS 532, dispenser 502, or other system at or outside the retail environment so that the retailer and dispenser owner/operator may register the beverage purchase. An operator at the retail environment may thereafter dispense the beverage. Alternatively, the second app 538 may communicate the beverage code 542. In an embodiment, the first app 536 may receive via the POS 532 or other device an order identifier (ID) 544 that is associated with the order of the user. In the event that the user does not have access to the second app 538, the user may place the beverage order with an operator of the POS 532, and the POS 532 may generate and communicate the order ID 544 directly or indirectly to the dispenser 502. The order ID 544 may be an alphanumeric value, such as a number, and may be communicated along with the beverage code 542 to the dispenser 502, which, in turn, may display the order ID 544 on the electronic display 508 so as to make it easier for the operator to place a displaced beverage with the order. In an embodiment, if multiple dispenser orders are communicated to the dispenser 502, the dispenser 502 may be configured to display multiple selectable beverage codes, order ID's, or data associated with the respective customers for the operator to select a beverage associated with an order to dispense, as provided in co-pending U.S. Patent Application Serial No. 2014/0040055. The order ID 544 may be communicated from the first app 536 to the second app 538 so that the second app 538 may communicate the order ID 544 with the beverage code 542.

In an embodiment, the first app 536 may be configured to provide a key (not shown) associated with the food services outlet to the second app 538 to enable a user who is not registered to use the second app 538 already to use the functionality of the second app 538 while located at the food services outlet. The second app 538 may query the dispenser server 526 to confirm that the key is active prior to allowing for the second app 538 to operate. If the user is registered with the second app 538, however, then the second app 538 may be used independent of the key. The first app 536 may receive a key from a beacon, server after determining that the mobile device is within a geo-fence of a food services outlet, or as stored on the mobile device. The first app 536 may display or instruct the second app 538 to display the most popular beverages or any other beverage statistic at the food services outlet.

While a food services outlet may be able to support the use of the first app 536 and second app 538 to provide an integrated and highly functional solution for supporting both food and beverage purchases at the outlet, the outlet or third party marketer may provide for promotional marketing to users of the first app 536 and/or second app 538. In an embodiment, the outlet and/or beverage dispenser operator (i.e., seller of beverages dispensed by the dispenser) may use incentives to users by tracking each user's food and/or beverage purchases, and offer rewards to the users. The rewards may be discounts or free food or beverages at the outlet (e.g., buy 10 get a free sandwich). Alternatively, the rewards may be discounts or free items outside of the outlet. As an example, an outlet or beverage dispenser operator may offer discount or free items from a third-party marketer (e.g., buy 10, receive an Amazon® or Apple iTunes® gift card worth $5). To support the promotional marketing, the retailer server 534 and/or dispenser server 526 may track purchases by each user of the first app 536 and/or second app 538. In an embodiment, a server (not shown) of a promotional marketer may receive a notification from either or both of the servers 534 and 526 with data indicating that the user has achieved a reward. The data may include identification data of the user or the user's account with any of the retailer/outlet, beverage dispenser operator, and/or third-party marketer.

Figure 6:
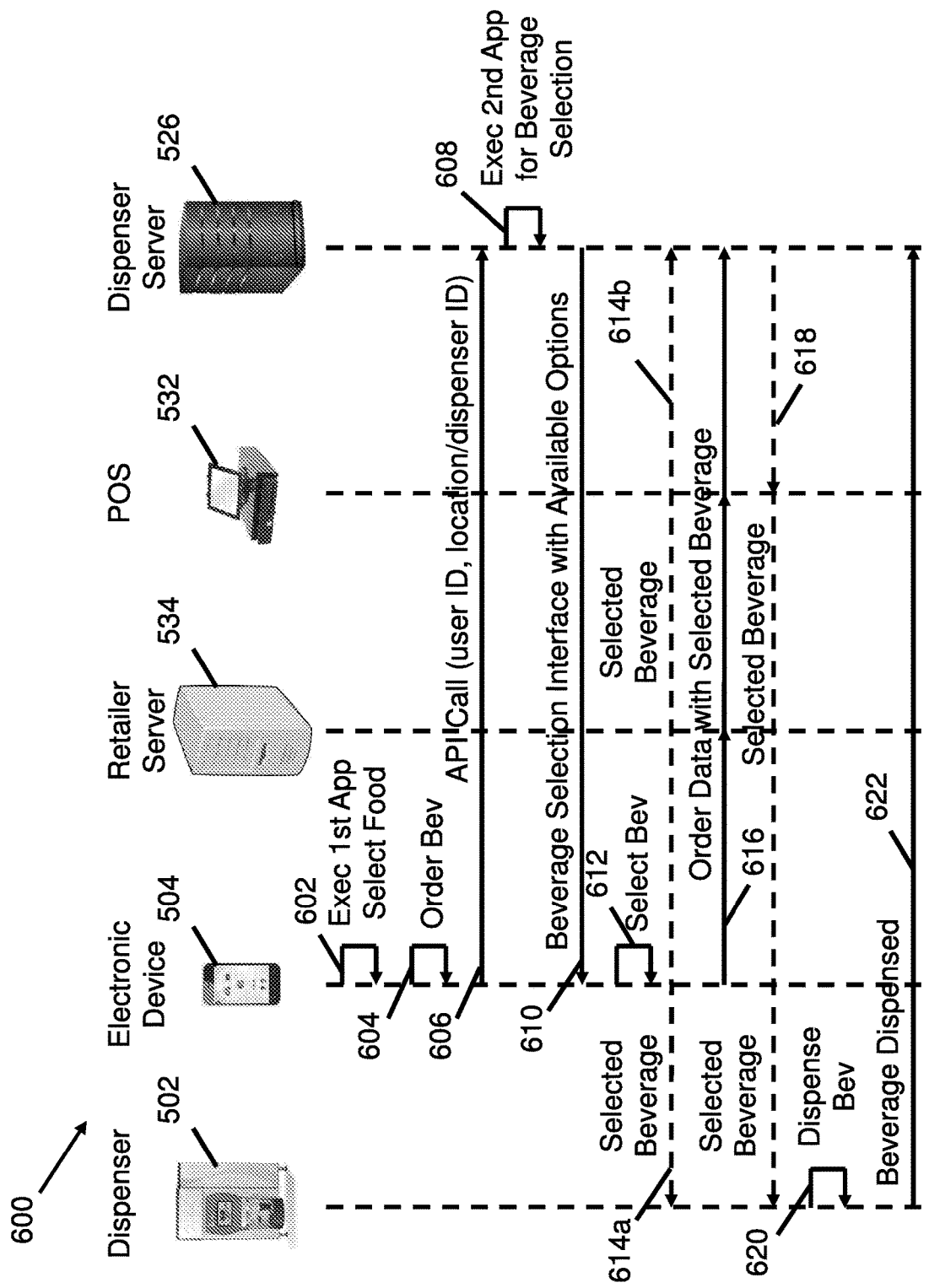
FIG. 6 is an illustration of an illustrative interactive diagram inclusive of the dispenser configured to dispense beverages selected by a user via the electronic device (e.g., smartphone) that may execute a first mobile app.

With regard to FIG. 6, an illustration of an illustrative interactive diagram 600 inclusive of the dispenser 502 configured to dispense beverages selected by a user via the electronic device 504 (e.g., smartphone) that may execute a first mobile app at step 602 is shown. In executing the first mobile app, the user may select food and/or non-food items available at a food outlet. As part of the first mobile app, the user may be able to order a beverage at step 604. The first mobile app may provide for a user to select a beverage as part of a meal or as an individual item. As previously described, the user may select to order a beverage by selecting a beverage size (e.g., small, medium, large) from the first mobile app, but selection of beverage ingredient(s) to include in the beverage may be performed by a second mobile app that may be called by the first mobile app.

As an alternative to FIG. 5, rather than the second mobile app being downloaded onto the electronic device 504 or integrated into the first mobile app being executed by the electronic device 504, an API call to the dispenser server 526 or another cloud-based server may be performed at step 606. The second app may be executed at step 608 by the dispenser server 526. The dispenser server 526 may access a database (not shown) stored at the dispenser server 526 or other server (not shown) over a communications network. The database may include records of some or all users who have accounts or previously used the second app, in this case a dispenser app, to provide the user with previously stored information, such as favorite beverages, previous blended beverages, and so on. In addition, the database may store dispenser and food outlet information so that beverage options provided to the user may accurately reflect ingredients available at the beverage dispenser, special beverages available at the food outlet, or any other information specifically set for the particular dispenser(s) and food outlet at which the user is requesting to purchase a beverage. The API call may include a number of parameters, including user ID, location, and/or dispenser ID. The location may include GPS data or an identifier received from a beacon within a food outlet, and the dispenser server 526 may determine the dispenser(s) local to the user, thereby providing the user with accurate dispenser ingredients and special blends being promoted by the food outlet, for example.

At step 610, a beverage selection user interface may be access and presented to the user of the electronic device 504. The user interface may be a webpage that may be viewable on a browser of the worldwide web, as understood in the art. At step 612, the user may select and/or create a blended beverage using the beverage selection user interface. In selecting a beverage, the user may select a standard single ingredient beverage or select a pre-established beverage containing multiple ingredients. In an embodiment, the user may select a favorite beverage based on previously submitted information by the user. The second app may generate a beverage code (not shown) for communication to the beverage dispenser to generate the beverage, where the beverage code may include ingredient(s) and percentages thereof to be included in the selected beverage.

In an optional step 614a, the mobile device 504 may be in direct wireless communication with the dispenser 502 and communicate the beverage code generated by the second app for producing the selected beverage. In an embodiment, in addition to communicating the beverage code to the dispenser 502, other information, including order number, user ID, or otherwise may be communicated to the dispenser 502 for display thereat so that an operator may select the information being displayed when ready to pour the beverage. It should be understood that the beverage code and/or other information associated with a beverage selection may be communicated to the dispenser 502 after completion and payment of the order. At step 614b, the beverage selection may be communicated to the dispenser server 526 for storage with the user's account or other purposes. In an embodiment, the dispenser server 526 may be in communication with the dispenser 502 and communicate the selected beverage (e.g., beverage code) to the dispenser 502 for dispensing.

At step 616, the electronic device 504 may communicate order data along with the selected beverage to the retailer server 534, POS 532, and/or dispenser server 526. The retailer server 534 may collect the data for managing food inventory. The POS 532 may use the data to generate an invoice for the user. The dispenser server 526 may collect the selected beverage information for managing ingredients by the dispenser and other statistical analysis purposes. At step 618, the dispenser server 526 may communicate the selected beverage (e.g., beverage code) to the beverage dispenser 502 along with identification information, such as order ID for displaying and dispensing the selected beverage thereat at step 620. The beverage information may also be communicated to the POS 532 for recording and/or billing purposes. At step 622, a beverage dispensed notification may be sent from the beverage dispenser 502 to the dispenser server 526 for recording thereby.

Figure 7:
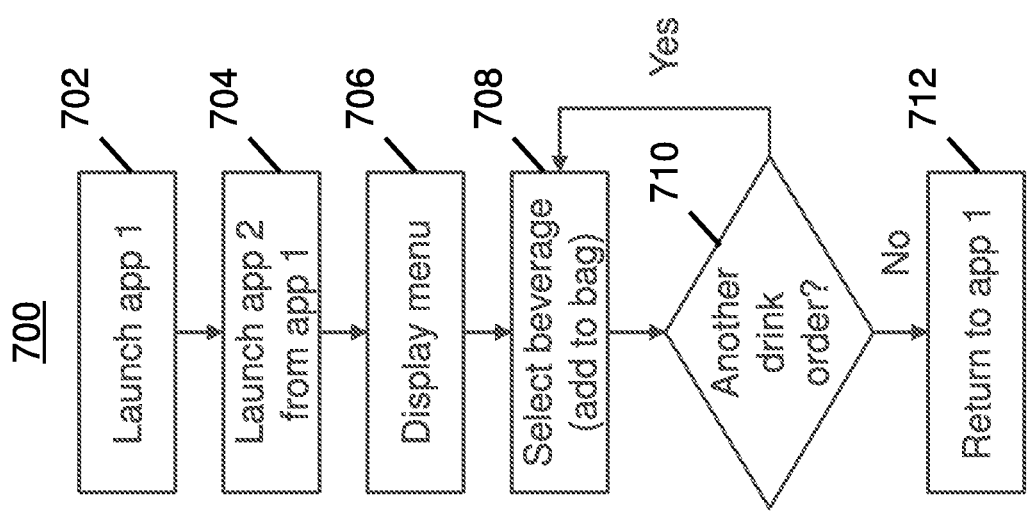
FIG. 7 is a flow diagram of an illustrative app execution process that enables a user to order beverages within a retail environment or food services outlet.

With regard to FIG. 7, a flow diagram of an illustrative app execution process 700 that enables a user to order beverages within a retail environment or food services outlet is shown. The process 700 may start at step 702, where a user may launch a first mobile app on a mobile device. It should be understood that rather than launching a mobile app, a cloud-based app or application may be launched on a mobile or other computing device. The first mobile app may be a food services mobile app that enables the user to select food and/or services to purchase at a food services outlet at which a beverage dispenser is located. The same or similar functionality may be provided for a non-beverage dispenser, as well. At step 704, a second mobile app may be launched from the first mobile app in response to the user selecting to purchase a beverage at the food services outlet. In an embodiment, second mobile app may be launched using deep linking or call to a function or routine within the second mobile app from the first mobile app such that the entire second mobile app may not be executed. In an alternative embodiment, functions or routines of the second mobile app may be embedded or otherwise integrated by a software development kit when creating the first mobile app. In that regard, an API for the second mobile app may be provided to enable the first mobile app to connect to the desire functions or routines of the second mobile app.

At step 706, a beverage selection menu may be displayed by the second mobile app or portion thereof being executed. The menu may include selectable beverages, blend options, favorite beverage options, or any other beverage selection feature available at the food services outlet via the beverage dispenser. In response to the user selecting to purchase a beverage at step 708, the first and/or second app may add the selected beverage to a "bag" or "shopping cart," as understood in the art, for purchase by the user. At step 710, a determination may be made as to whether another drink order is made by the user. If so, then the process 700 returns to step 708 for the user to select or create another beverage. Otherwise, the process continues to step 712, where the process 700 returns to the first mobile app for further food purchases, payment, and/or checkout at the food services outlet.

Figure 8:
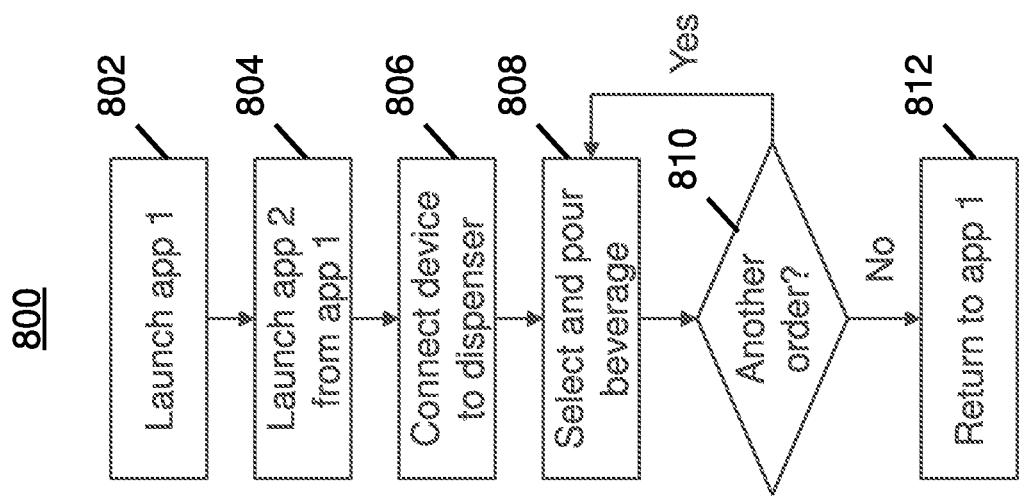
FIG. 8 is a flow diagram of an illustrative app execution process that enables a user to order beverages within a retail environment or food services outlet.

With regard to FIG. 8, a flow diagram of an illustrative app execution process 800 that enables a user to order beverages within a retail environment or food services outlet is shown. The process 800 may start at step 802, where a user may launch a first mobile app on a mobile device. The mobile app may be cloud-based, as well. The first mobile app may be a food services mobile app that enables the user to select food and/or services to purchase at a food services outlet at which a beverage dispenser is located. At step 804, a second mobile app may be launched from the first mobile app in response to the user selecting to purchase a beverage at the food services outlet. At step 806, the mobile device may connect to a dispenser located at the food services outlet using an number of communications protocols, including local or wide-area communications protocols as understood in the art and as previously described herein. The second mobile app may display a list of selectable beverages, which may include beverages with multiple ingredients previously created by the user, for the user to select. Once selected, the mobile device may communicate a beverage code or other indicator to the dispenser to create and dispense the selected beverage at step 808. By using the direct connection, a point-of-sale or other system may not have to be reconfigured to process beverage orders beyond processing a size of beverage that was selected for purchase. At step 810, a determination may be made as to whether another drink order is made by the user. If so, then the process 800 returns to step 808 for the user to select or create another beverage and pour or dispense the beverage. Otherwise, the process continues to step 812, where the process 800 returns to the first mobile app for further food purchases, payment, and/or checkout at the food services outlet.

Figure 9:
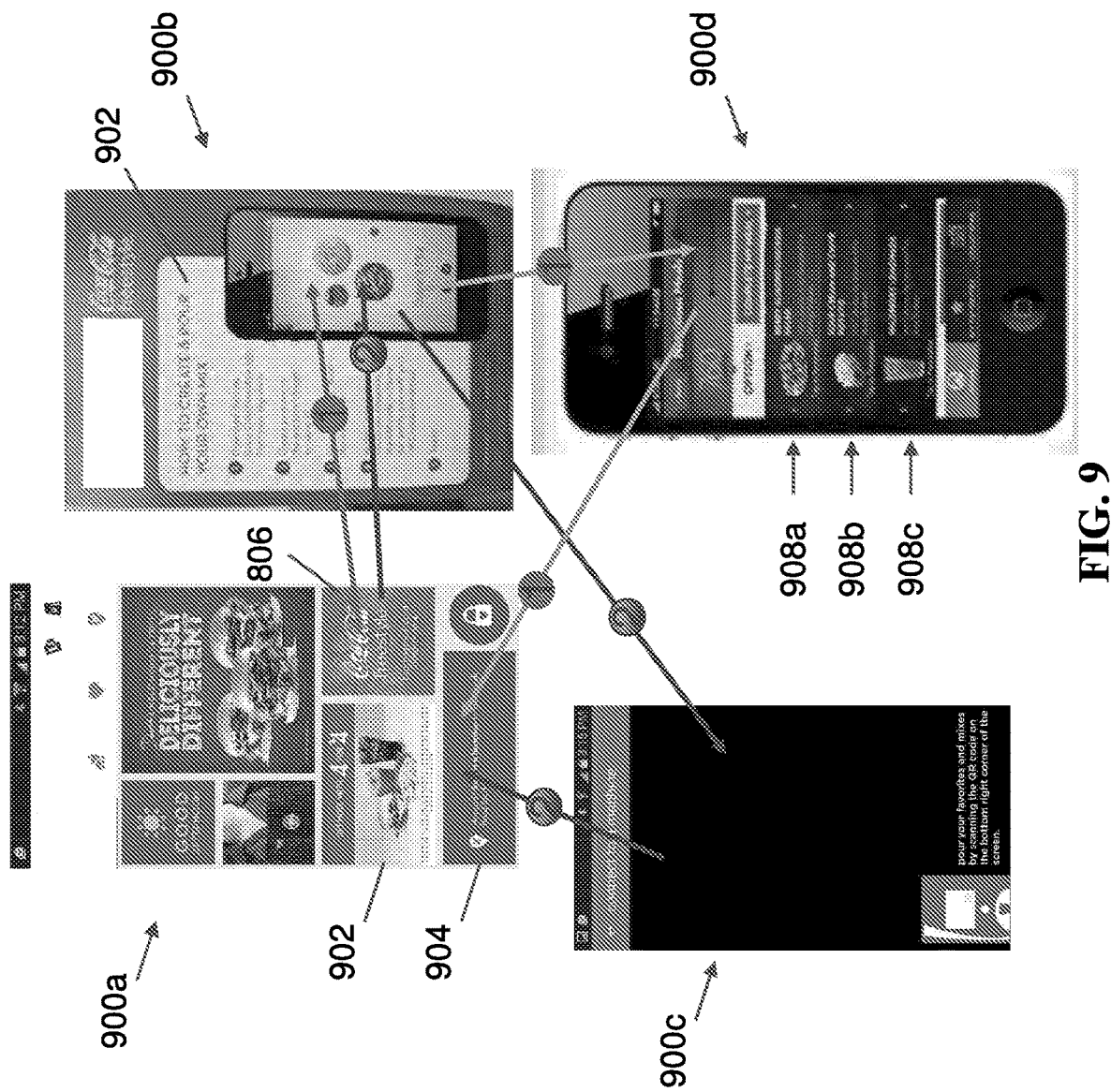
FIG. 9 is four screen shots of an illustrative user interface.

With regard to FIG. 9, four screen shots of an illustrative user interface are shown. The screen shots may include a main menu 900a of a first mobile app that is provided by a food services outlet, in this case a restaurant. The main menu 900a may display a number of different regions, including a specials region 902, food selection region 904, and beverage selection region 906. Each of the regions 902, 904, and 906 may operate as hyperlinks to another user interface that enable the user to make a food or beverage selection. Other regions and soft-buttons may also be provided for the user on the main menu 900a to view other food and non-food offerings at the food services outlet.

In response to a user selecting the beverage selection region 906, a second mobile app or portion thereof may be launched to cause a user interface 900b to be displayed. The user interface 900b be of a tutorial page to assist the user in selecting an pouring a beverage. The user interface 900b may provide instructions on "How to Create & Pour Your Own Mix" so that the user may be able to create his or her own beverage that includes one or more beverage brands and/or ingredients. In an embodiment, if the user has seen the tutorial page in the past, the second app may not display the user interface 900b. After the user interface 900b is shown (or not shown if the user had previously seen the tutorial), then a user interface 900c may be displayed by the second mobile app.

The user interface 900c may provide for the user to select or create his or her own beverage or beverage mix. In an embodiment, the user interface 900c may also enable the user to interact with a beverage dispenser, including scanning a QR or other machine readable code positioned or displayed on the beverage dispenser. In an embodiment, the user interface 900c may enable the user to selectably connect with a dispenser at the food services outlet. Alternatively, the user interface 900c may notify the user that the mobile device has automatically connected with the dispenser. A selectable soft-button (not shown) may be selected by the user to list saved favorite beverages or beverage mixes that were produced by the user or shared by another user. Another selectable soft-button (not shown) may cause the user interface 900c to display selectable ingredients and/or flavors for the user to select and create a blend of the selected ingredients. The selected or created blended beverage may be converted into a drink code representative of the ingredients, and communicated from the mobile device directly or indirectly to the dispenser for dispensing thereby. In an embodiment, the first app may communicate an order code (not shown) to the second app once received from a server or POS that receives the food and/or beverage order from the user.

A user interface 900d may present a list of available food and/or beverage options 908a-908c (collectively 908) for the user to select to complete his or her meal. Option 908c is a "Wildberry Lemonade" beverage option. Responsive to the user selecting option 908c, the first app may call the second app and supply the selected beverage option to the second app. Other options may provide for the user to create his or her own beverage mixes with one or more available ingredients at the dispenser in the food services outlet.

Figure 10:
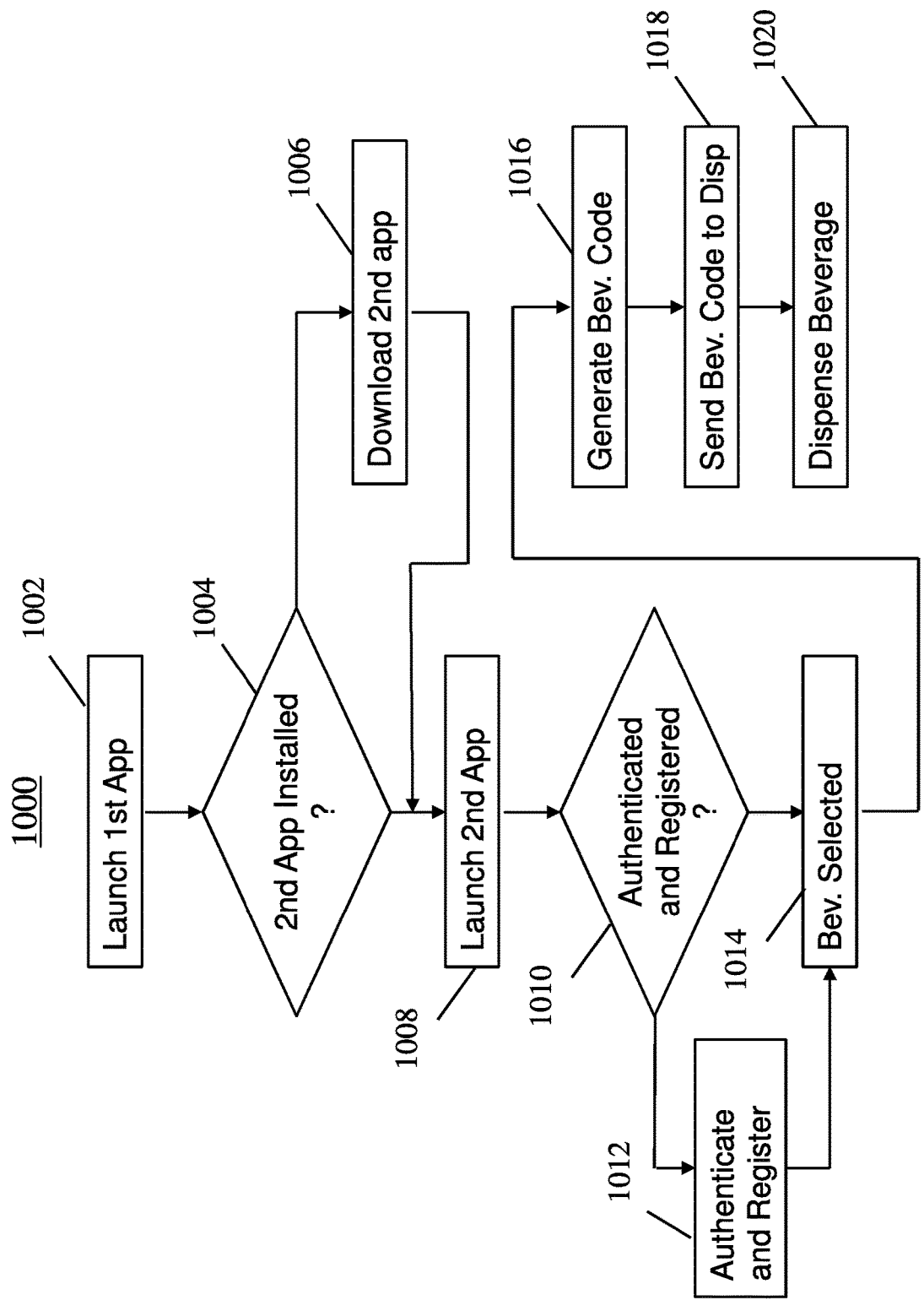
FIG. 10 is a flow diagram of an illustrative process for executing a food services outlet app (first app) that utilizes one or more functions of a beverage dispenser app (second app)

With regard to FIG. 10, a flow diagram of an illustrative process 1000 for executing a food services outlet app (first app) that utilizes one or more functions of a beverage dispenser app (second app) is shown. The process 1000 may start at step 1002, where the first app may be launched. As previously described, the first app may be a food ordering app that may allow for a beverage to be ordered. At step 1004, a determination may be made as to whether a second app, such as a beverage dispenser app, is installed. The determination may be made by the first app detecting whether the second app is downloaded and installed on a mobile device, for example. If it is determined that the second app is not installed, then the process may continue at step 1006, where the second app may be downloaded to an electronic device on which the first app is being executed. The second app may be downloaded from an online store, as understood in the art, by the second app causing an online store to be automatically loaded and the second app presented to the user for downloading. If a determination at step 1004 is made that the second app is installed on the mobile device, then the process may continue at step 1008 where a second app may be launched.

In launching the second app, a determination may be made as to whether the user has been authenticated and previously registered with the second app at step 1010. If not authenticated and previously registered, then the user may be requested to be authenticated and registered at step 1012 by entering information, such as name, password, or other information. In an alternative embodiment, if the first app provides a key to the second app, the authentication and registration process may be skipped. If previously registered, then a determination may be made as to whether pre-existing data, such as mixed beverage data created by the user, is stored on the mobile device or on a remote server. At step 1014, the user may be presented with a user interface to enable user to select a beverage or generate a beverage that he or she wishes to purchase at the food services outlet. In response to the user selecting a beverage or creating a beverage, a beverage code or beverage instruction code, may be generated at step 1016. At step 1018, a communication of a beverage code may be communicated directly or indirectly to a dispenser. Alternatively, the beverage code may be communicated to the first app for communication therefrom to the dispenser, point-of-sale, or server configured to support purchases at the food services outlet. At step 1020, a select a beverage may be dispensed by the dispenser to which the beverage code was communicated. If the second app is integrated with the first app using an API link as configured using a software development kit, then steps 1004 and 1006 may not be used by the process.

Figure 11:
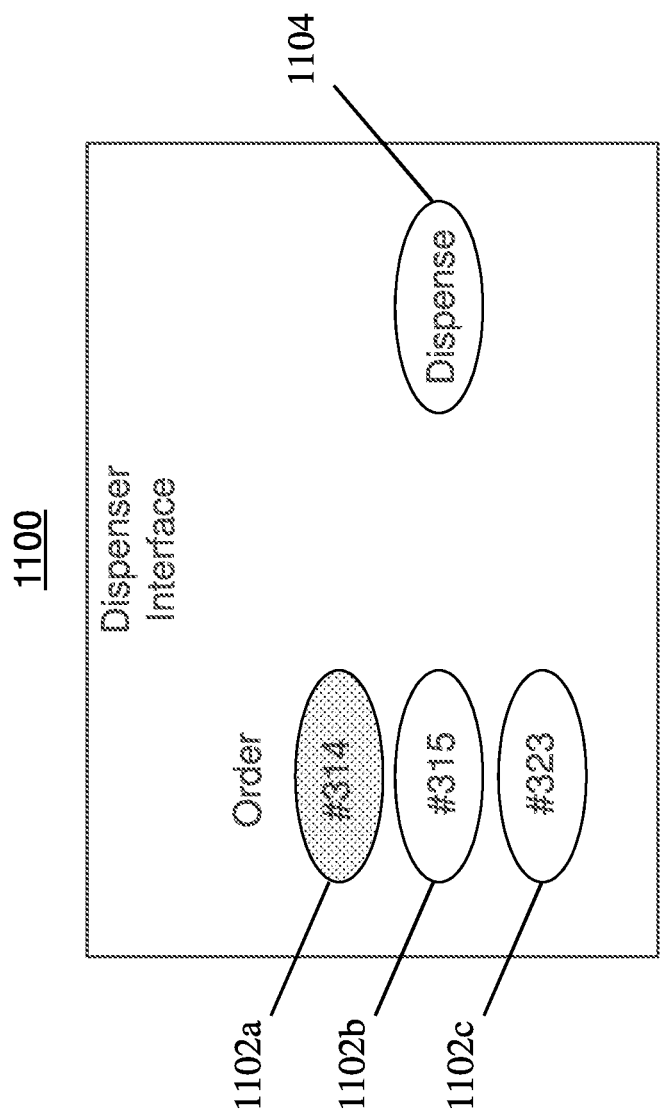
FIG. 11 is a screen shot of an illustrative user interface of a dispenser.

With regard to FIG. 11, a screen shot of an illustrative user interface 1100 of a dispenser, such as a beverage dispenser, is shown. The user interface 1100 may include a set of order soft-buttons 1102a-1102c (collectively 1102) that are associated with orders, including food orders, from a user of a food services outlet mobile app that may be integrated with a beverage mobile app, as previously described herein. The dispenser may receive an order ID from each order in which a beverage to be dispensed is included. As shown, three beverages are to be dispensed in associate with three orders, including orders #314, #315, and #323. In an embodiment, a listing of ingredient(s) (e.g., brand names and flavors thereof) of each order may be listed in association with the order IDs to allow the user or operator of the dispenser to confirm the ingredient(s) being dispensed. The user or operator may dispense a beverage in association with an order, such as order soft-button 1102a (order #314), and select a "Dispense" soft-button 1104 to begin dispensing the beverage. By selecting the order soft-button 1102a, the dispenser may automatically be configured to create a beverage. As an example, if the user selected two ingredients to be blended, the dispenser may be configured to dispense both ingredients when dispensing the beverage. It should be understood that alternative configurations of the user interface may be provided for the user or operator of the dispenser.

Figure 12:
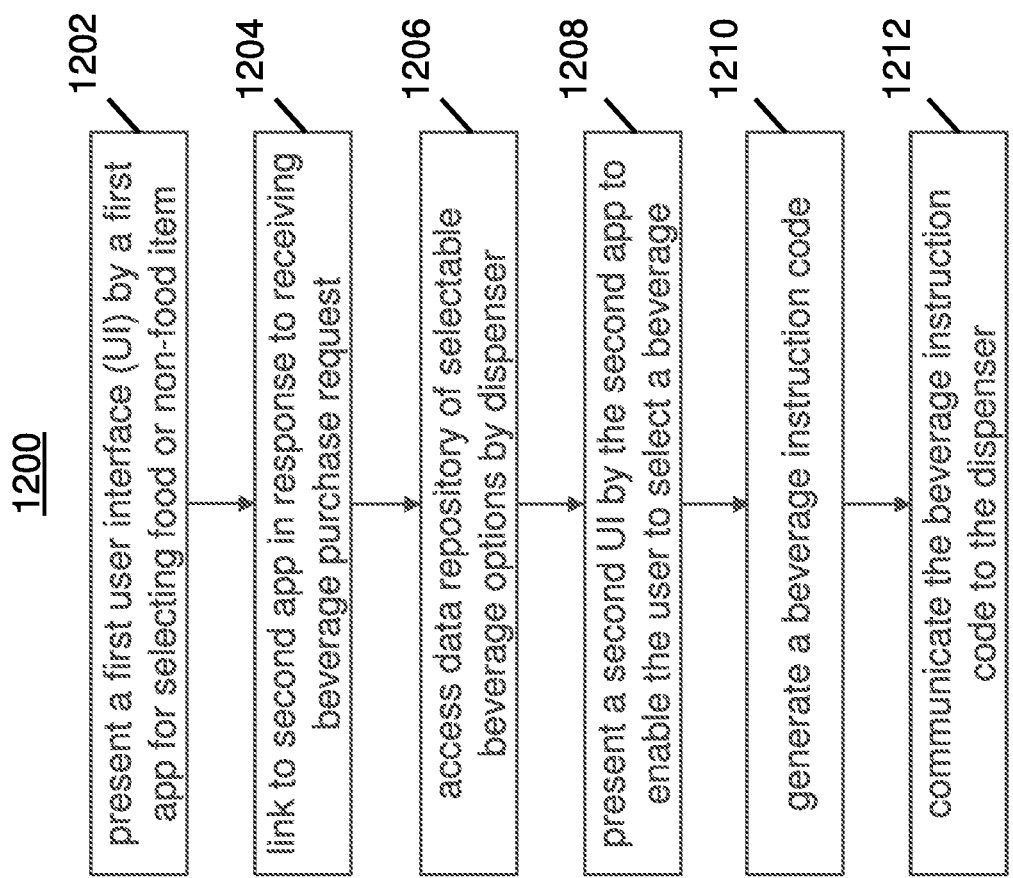
FIG. 12 is a flow diagram of an illustrative process for providing beverages at a retail establishment.

With regard to FIG. 12, a flow diagram of an illustrative process 1200 for providing beverages at a retail establishment is shown. The process 1200 may start at step 1202 by presenting, by a first application being executed by an electronic device, a user interface that enables a user to select a food item and/or non-food item for purchase at a retail establishment. At step 1204, in response to receiving, by the first application, a request from the user using the first user interface to purchase a beverage at the retail establishment, a linking from the first application to a second application may be performed for execution by the electronic device. The second application may access a data repository inclusive of multiple selectable beverage options available for dispensing by a beverage dispenser at the retail establishment at step 1206. At step 1208, the second application may present a second user interface to enable the user to select one of the selectable beverage options. A selected beverage instruction code representative of a selected beverage may be generated at step 1210, and the selected beverage instruction code may be communicated to a beverage dispenser at the retail establishment at step 1212. The selected beverage instruction code may cause the beverage dispenser to be configured for dispensing the selected beverage.

Figure 13:
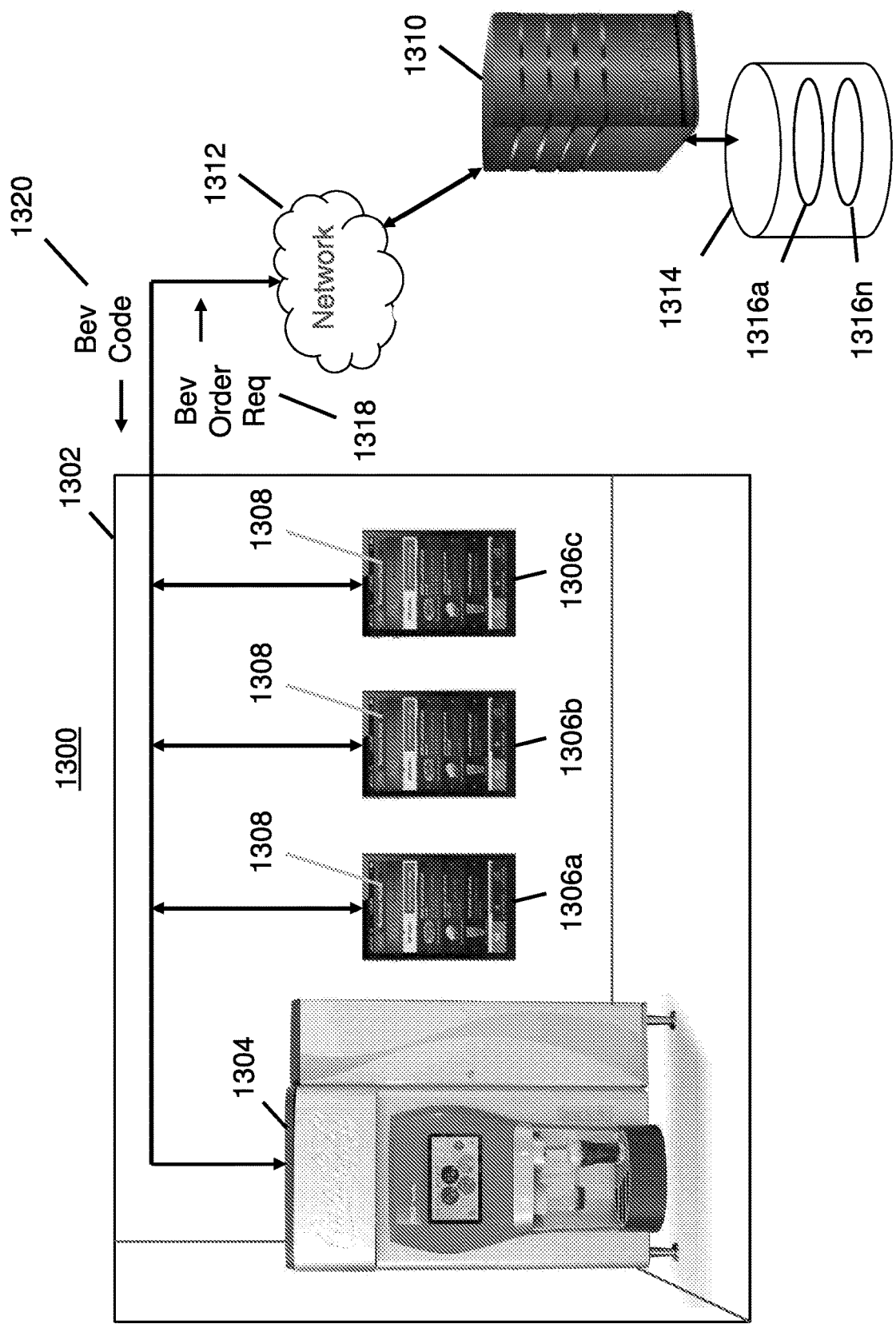
FIG. 13 is an illustration of an illustrative food outlet environment with a computing environment that supports a food outlet app and beverage app that enables users to purchase food and beverages within a food outlet.

With regard to FIG. 13, an illustration of an illustrative food outlet environment 1300 with a computing environment that supports a food outlet app and beverage app that enables users to purchase food and beverages within a food outlet 1302 is shown. The food outlet may be any location at which food and beverages are available to consumers to purchase. The food outlet 1302 may enable users to utilize personal mobile electronic devices to place food and beverage orders, as previously described, using a food outlet app and a beverage dispenser app on their mobile devices. As shown in the food outlet 1302, a beverage dispenser 1304 may be in communication with remote electronic devices 1306a-1306c (collectively 1306) that provide for a customer to purchase food and/or beverages by interacting with a user interface 1308 displayed thereon. The remote electronic devices 1306 may be local to the dispenser 1304, and either be in direct or indirect communication with the dispenser 1304 using a wired or wireless communications path.

The user interface 1308 may be common to each other, and be configured to display the same or similar information in the same or different configuration that available on a personal mobile electronic device of a consumer. A customer may use the remote electronic devices 1306 to select food and beverages. In an embodiment, the devices 1306 may be configured as kiosks. Alternatively, and as shown, the devices 1306 may be affixed to a wall. The devices 1306 may be positioned at different heights for different heights of users. Any other configuration may be utilized, including affixing brackets to the dispenser 1304 that extend to the side of the dispenser 1304.

To support the remote electronic devices 1306, a server 1310 may be located on a network 1312, such as the Internet. The server 1310 may be in communication with a storage unit 1314 that stores one or more data repositories 1316-1316n (collectively 1316) with information associated with dispensers, registered users, food outlets, beverage ingredients (e.g., brands and flavors that may be added to beverages), and so on. Each food outlet or chain of food outlets may support different ingredients in their respective dispensers. The data repositories 1316 may store the ingredients available at each dispenser and/or each food outlet, thereby presenting beverage selections to the consumer that are available at that food outlet.

The apps being executed on the remote electronic devices 1306 may be downloaded onto the remote electronic devices 1306 so as to be resident thereon and operated using deep linking or formed as a single app using a software development kit and API calls. Communications with the remote server 1310 may be performed to obtain consumer data (e.g., favorites, blends, etc.). Alternatively, the food outlet app may be resident on the remote electronic devices 1306, and a beverage dispenser app may be called via the network 1312 to provide beverage selection functions, as previously described.

Moreover, and as previously presented, the customer may access his or her beverage dispenser account via the user interface 1308 so as to select a beverage brand or blended beverage that had previously been created by the consumer or otherwise selectably available. The food and beverage orders made by the consumer may be communicated to a point-of-sale (not shown) or remote server (not shown) for purchasing of the ordered food and beverages. Responsive to the beverage selection being made, a beverage code (not shown) may be communicated to the dispenser 1302 for selection and/or production thereon. Depending on the configuration of the dispenser 1302 and other system elements, any of the devices (e.g., POS, food outlet server, remote electronic devices 1306, remote server 1310) may communicate with the dispenser 1302 for dispensing thereon. In addition to the beverage code, other information, including an order identifier, user identifier (e.g., user name), beverage size, and so on may be communicated to the beverage dispenser 1302 so that the beverage, once dispensed, can be associated with the remainder of the consumer's order. Any of the user identifier, order identifier, or beverage identification information contained in the beverage code or otherwise may be displayed at the dispenser for an operator to view and select when dispensing the beverage.

As a result of having one or more remote electronic devices 1306, a single dispenser can be simultaneously programmed to dispense a beverage for multiple users. That is, the beverage dispenser 1302 may be utilized by a first customer, while each of the remote electronic devices 1306a-1306c may be used by other customers to select their beverages, and the beverage selections may be communicated to the dispenser 1302 for dispensing. The dispenser 1302 may store and display selectable beverage orders to be selected on the user interface 1308 by a customer so as to be dispensed by the dispenser 1302.

As shown, a user may use one of the remote electronic devices 1306a to request a beverage, and a beverage order request 1318 may be communicated to a second app being executed on the remote server 1310. The remote electronic device 1306a may display beverage selection options via a website or other interface that causes the remote server 1310 to communicate a beverage code 1320 to the dispenser 1302, optionally with an order ID, for enabling an operator, such as a worker, to dispense the selected beverage. As previously described, other devices, such as a point-of-sale device (not shown) or remote electronic device 1306a, may communicate the beverage code 1320 to the dispenser.

In an embodiment, the electronic device may establish a communications session with the beverage dispenser, and communicate, via a communications network, the selected beverage instruction code during the communications session to the beverage dispenser. The second application may present multiple beverage brands and flavors of the beverage brands for the user to select, and, responsive to the user selecting a beverage brand and flavor of the beverage brand, the selected beverage instruction code may be generated. In an embodiment, either of the first or second application may enable the user to select a beverage size to be dispensed by the dispenser. The first application may establish a communications session with a point-of-sale of the retail establishment, and enable payment for the food items, non-food items, and/or selected beverage with the point-of-sale. The first application may receive an order identifier associated with the order, and communicate, by the second application via the electronic device, the order identifier to the dispenser for display thereat.

In an embodiment, the second application may receive a security key associated with the retail establishment from the first application to enable the second application to operate at the retail establishment. In response to the second application receiving the security key from the first application, a security key database may be queried to determine whether the security key is activated, and, in response to determining that the security key is activated, the user may be enabled to use the second application to order a beverage, otherwise, the user may be prevented from ordering a beverage. If the security key is activated, then the user may utilize the second application without having to register.

The first application may link with the second application by deep linking to the second application. A determination may be made by the electronic device as to whether the second application is installed on the electronic device. More particularly, the determination may be made by the first application. In response to determining that the second application is not installed on the electronic device, a notification may be generated and presented to the user to download the second application. In response to receiving a confirmation from the user to download the second application, the electronic device may download the second application, otherwise, the second application may not be downloaded. In response to downloading the second application, the second application may be launched to provide for presenting the second user interface to the user. The electronic device may be a mobile electronic device.

The second user interface may further be configured to enable the user to generate a blended beverage from multiple selectable beverage options available for dispensing by the beverage dispenser. The second user interface may further be configured to enable the user to select a percentage of each of the selected beverage options to be blended. In accessing the data repository, a communication via a wireless network to a server configured to store a set of selectable beverage options available to be dispensed at the retail establishment by the beverage dispenser may be performed. In an embodiment, a processing unit may be configured to count a number of beverages dispensed for a user, determine that the number of beverages dispensed for the user crosses a threshold level, and communicate, via a communications network, a reward to the user for a product or service in response to the number of dispensed beverages crossing the threshold level.

It should also be understood that the dispenser may be any other consumable item dispenser or vending machine. As examples, the consumable item dispensers may be candy vending machines, beverage can or bottle vending machines, ice cream dispensers, and so on. A variety of uses of the integrated first and second apps may be supported. For example, businesses, such as movie theaters, retail stores, automobile dealerships, shopping malls, sports venues, amusement parks, or any other location that has beverage dispensers capable of dispensing one or more beverages and, optionally, blended ingredient beverages.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A method, comprising:
presenting, by a first application being executed by an electronic device, a first user interface that enables a user to select a food item and/or non-food item for purchase at a retail establishment;
in response to receiving, by the first application, a request from the user using the first user interface to purchase a beverage at the retail establishment, linking to a second application for execution by the electronic device for selecting beverages for purchase at the retail establishment;
accessing, by the second application, a data repository inclusive of a plurality of selectable beverage options available for dispensing by a beverage dispenser at the retail establishment;
presenting, by the second application, a second user interface to enable the user to select one of the selectable beverage options;
generating a selected beverage instruction code representative of a selected beverage;
communicating, by the second application, the selected beverage instruction code to the beverage dispenser at the retail establishment to cause the beverage dispenser to be configured for dispensing the selected beverage; and
causing the beverage dispenser to dispense the selected beverage based on the selected beverage instruction code.

2. The method according to claim 1, wherein communicating includes:
causing the electronic device to establish a communications session with the beverage dispenser; and
communicating, by the electronic device via a communications network, the selected beverage instruction code during the communications session to the beverage dispenser.

3. The method according to claim 2, further comprising:
presenting, by the second application, a plurality of beverage brands and flavors of the beverage brands for the user to select; and
responsive to the user selecting a beverage brand and flavor of the beverage brand, generating the selected beverage instruction code.

4. The method according to claim 3, further comprising enabling, by the first or second application, the user to select a beverage size to be dispensed by the dispenser.

5. The method according to claim 1, further comprising:
establishing, by the first application, a communications session with a point-of-sale of the retail establishment; and
enabling payment for the food items, non-food items, and/or selected beverage with the point-of-sale.

6. The method according to claim 1, further comprising:
receiving, by the first application, an order identifier associated with the order; and
communicating, by the second application via the electronic device, the order identifier to the dispenser for display thereat.

7. The method according to claim 1, further comprising:
receiving, by the second application from the first application, a security key associated with the retail establishment to enable the second application to operate at the retail establishment;
in response to the second application receiving the security key from the first application, querying a security key database to determine whether the security key is activated; and
in response to determining that the security key is activated, enabling the user to use the second application to order a beverage, otherwise, preventing the user from ordering a beverage.

8. The method according to claim 1, wherein linking includes deep linking to the second application.

9. The method according to claim 1, wherein linking to includes linking to the second application over a communication network.

10. The method according to claim 1, further comprising:
determining, by the electronic device, whether the second application is installed on the electronic device; and
in response to determining that the second application is not installed on the electronic device:
generating a notification to the user to download the second application;
in response to receiving a confirmation from the user to download the second application, downloading, by the electronic device, the second application, otherwise, not downloading the second application; and
in response to downloading the second application, launching the second application to provide for presenting the second user interface to the user.

11. The method according to claim 1, wherein the first and second applications are mobile apps, and wherein the electronic device is a mobile electronic device.

12. The method according to claim 1, wherein the second user interface is further configured to enable the user to generate a blended beverage from a plurality of selectable beverage options available for dispensing by the beverage dispenser, and wherein the second user interface is further configured to enable the user to select a percentage of each of the selected beverage options to be blended.

13. The method according to claim 1, wherein accessing the data repository includes communicating, via a wireless network, to a server configured to store a set of selectable beverage options available to be dispensed at the retail establishment by the beverage dispenser.

14. The method according to claim 1, further comprising:
counting, by a processing unit, a number of beverages dispensed for a user;
determining, by the processing unit, that the number of beverages dispensed for the user crosses a threshold level; and
communicating, via a communications network, a reward to the user for a product or service in response to the number of dispensed beverages crossing the threshold level.

15. A system, comprising:
an electronic display;
a non-transitory memory; and
a processing unit in communication with said electronic display and non-transitory member, and configured to:
execute a first application and a second application, that, when executed by said processing unit, causes said processing unit to:
present a user interface that enables a user to select a food item and/or non-food item for purchase at a retail establishment;
in response to receiving a request from the user using the first user interface to purchase a beverage at the retail establishment, link to the second application for execution for selecting beverages for purchase at the retail establishment;

access a data repository inclusive of a plurality of selectable beverage options available for dispensing by a beverage dispenser at the retail establishment;

present a second user interface to enable the user to select one of the selectable beverage options;

generate a selected beverage instruction code representative of a selected beverage;

communicate, by the second application, the selected beverage instruction code to the beverage dispenser at the retail establishment to cause the beverage dispenser to be configured for dispensing the selected beverage; and cause the beverage dispenser to dispense the selected beverage based on the selected beverage instruction code.

16. The system according to claim 15, wherein said processing unit, in communicating, is further configured to:
cause a communications session to be established between said processing unit and the beverage dispenser; and
communicate, via a communications network, the selected beverage instruction code during the communications session with the beverage dispenser.

17. The system according to claim 16, wherein the first and second applications being executed by said processing unit are further configured to cause said processing unit to:
present a plurality of beverage brands and flavors of the beverage brands on said electronic display for the user to select; and
responsive to the user selecting a beverage brand and flavor of the beverage brand, generate the selected beverage instruction code.

18. The system according to claim 17, wherein the first and second applications being executed by said processing unit are further configured to cause said processing unit to enable, by the first or second application, the user to select a beverage size to be dispensed by the dispenser.

19. The system according to claim 15, wherein the first application being executed by said processing unit is further configured to cause said processing unit to:
establish, by the first application, a communications session with a point-of-sale of the retail establishment; and
enable payment for the food items, non-food items, and/or selected beverage with the point-of-sale.

20. The system according to claim 15, wherein the first and second applications being executed by said processing unit are further configured to cause said processing unit to:
receive an order identifier associated with the order; and
communicate the order identifier to the dispenser for display thereat.

21. The system according to claim 15, wherein the first and second applications being executed by said processing unit are further configured to cause said processing unit to:

receive a security key associated with the retail establishment to enable the second application to operate at the retail establishment;
in response to receiving the security key, query a security key database to determine whether the security key is activated; and
in response to determining that the security key is activated, enable the user to use the second application to order a beverage.

22. The system according to claim 15, wherein said processing unit, in linking, is further configured to deep link from the first application to the second application.

23. The system according to claim 15, wherein said processing unit, in linking, is further configured to communicate over a communications network to the second application.

24. The system according to claim 15, wherein the first application being executed by said processing unit is further configured to cause said processing unit to:
determine whether the second application is installed on the electronic device; and
in response to determining that the second application is not installed:
generate a notification to the user to download the second application;
in response to receiving a confirmation from the user to download the second application, download, by the electronic device, the second application, otherwise, not downloading the second application; and
in response to downloading the second application, launching the second application to provide for presenting the second user interface to the user.

25. The system according to claim 15, wherein the first and second applications are mobile apps, and wherein the electronic device is a mobile electronic device.

26. The system according to claim 15, wherein the second user interface is further configured to enable the user to generate a blended beverage from a plurality of selectable beverage options available for dispensing by the beverage dispenser, and wherein the second user interface is further configured to enable the user to select a percentage of each of the selected beverage options to be blended.

27. The system according to claim 15, wherein said processing unit, in accessing the data repository, is further configured to communicate, via a wireless network, to a server configured to store a set of selectable beverage options available to be dispensed at the retail establishment by the beverage dispenser.

28. The system according to claim 15, further comprising:
a processing unit configured to:
a number of beverages dispensed for a user;
determine that the number of beverages dispensed for the user crosses a threshold level; and
communicate a reward to the user for a product or service in response to the number of dispensed beverages crossing the threshold level.

* * * * *